(12) United States Patent
Föhler

(10) Patent No.: US 6,476,588 B2
(45) Date of Patent: Nov. 5, 2002

(54) VOLTAGE TRANSFORMER AND ASSOCIATED OPERATING METHOD

(75) Inventor: Manfred Föhler, Mühlhausen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/785,344

(22) Filed: Feb. 16, 2001

(65) Prior Publication Data

US 2001/0019258 A1 Sep. 6, 2001

(30) Foreign Application Priority Data

Feb. 16, 2000 (DE) .......................... 100 06 960

(51) Int. Cl.[7] .............................. G05F 1/10; G05F 1/40; H02M 1/12
(52) U.S. Cl. .................... 323/222; 323/285; 363/49
(58) Field of Search ................... 323/222, 282, 323/285, 210, 211, 273, 266, 281; 363/89, 98, 95, 124, 53, 49

(56) References Cited

U.S. PATENT DOCUMENTS

| | | | | |
|---|---|---|---|---|
| 4,084,103 A | * | 4/1978 | Burns, III et al. | 307/132 R |
| 4,618,812 A | * | 10/1986 | Kawakami | 323/224 |
| 4,929,882 A | * | 5/1990 | Szepesi | 323/222 |
| 5,309,082 A | * | 5/1994 | Payne | 323/270 |
| 5,359,275 A | * | 10/1994 | Edwards | 323/207 |
| 5,457,622 A | * | 10/1995 | Arakawa | 363/59 |
| 5,818,707 A | * | 10/1998 | Seong et al. | 363/89 |

FOREIGN PATENT DOCUMENTS

| | | |
|---|---|---|
| JP | 62-185559 A | 8/1987 |
| JP | 2-280661 A | 11/1990 |
| JP | 08 126 303 A | 5/1996 |
| JP | 10 327 575 A | 12/1998 |

\* cited by examiner

*Primary Examiner*—Rajnikant B. Patel
(74) *Attorney, Agent, or Firm*—Laurence A. Greenberg; Werner H. Stemer; Ralph E. Locher

(57) ABSTRACT

A voltage transformer includes a voltage input and a voltage output. A capacitor is disposed on the output side for providing an output voltage. A controllable switching element controls a current flowing through a coil. A control unit is connected on the output side to the switching element, for controlling switching times of the switching element. The control unit controls the switching times as a function of the input and output voltages. An associated operating method is also provided.

2 Claims, 4 Drawing Sheets

VOLTAGE TRANSFORMER AND ASSOCIATED OPERATING METHOD

BACKGROUND OF THE INVENTION

Field of the Invention

The invention relates to a voltage transformer, in particular for a motor vehicle network, having a voltage input and a voltage output, a capacitor disposed on the output side for providing an output voltage, a coil, a controllable switching element for controlling a current flowing through the coil, the switching element having switching times for setting a voltage ratio, and a control unit having an output side connected to the switching element, for controlling the switching times of the switching element. The invention also relates to an operating method for such a voltage transformer.

Voltage transformers which are known as step-up switched-mode regulators, for example, permit a relatively low battery voltage that is usually 12 volts in a motor vehicle network to be converted into a higher operating voltage. Such voltage transformers have a capacitor on the output side which provides the operating voltage and is recharged by the battery voltage through a series circuit composed of a coil and a diode. A transistor which is disposed between the coil and the diode optionally conducts the coil or charging current through the capacitor, or bridges the latter. At the start of the charging operation, the transistor is switched on, and therefore a relatively large coil current builds up, although it is inducted past the capacitor. After the maximum permissible coil current is achieved, the transistor is then blocked, whereupon the coil current flows as charging current through the capacitor and recharges the latter, until the coil current finally is extinguished. The transistor is subsequently then switched on again until the maximum permissible coil current is reached. The capacitor is thereby recharged to voltages which are higher than the battery voltage by alternately switching the transistor on and off.

In that case, the output voltage is set by the switching times ($T_{ON}$, $T_0$, $T_{OFF}$) of the transistor. The transistor is driven by a control unit, that is also designated as a step-up regulator, which measures the output voltage, on one hand, and the coil current, on the other. In addition to setting the desired output voltage, the control unit also has the task of avoiding an excessive rise in the coil current as the transistor is being switched through. Therefore, the control unit measures the coil current continuously and switches off the transistor when the maximum permissible coil current is reached.

An advantage of that known voltage transformer is the possibility of very accurate regulation of the output voltage. However, that is associated with a relatively high outlay for hardware which is not required in many applications, since a linear regulator which undertakes fine regulation of the output voltage in any case is connected downstream of the voltage transformer, for example in motor vehicle networks. It would therefore suffice in many cases to have a voltage transformer which permits voltage transformation in conjunction with a low outlay for hardware and a correspondingly low accuracy of the output voltage.

SUMMARY OF THE INVENTION

It is accordingly an object of the invention to provide a voltage transformer and an associated operating method, which overcome the hereinafore-mentioned disadvantages of the heretofore-known devices and methods of this general type and in which the voltage transformer permits voltage transformation in conjunction with the lowest possible outlay for hardware, with requirements placed on accuracy of an output voltage not being particularly stringent.

With the foregoing and other objects in view there is provided, in accordance with the invention, a voltage transformer, comprising an input side having a voltage input carrying an input voltage and an output side having a voltage output carrying an output voltage. A capacitor is disposed on the output side, for providing the output voltage. A coil is provided having a coil current. A controllable switching element is connected to the coil for controlling current flowing through the coil. The switching element has switching times for setting a voltage ratio. A control unit has an input side connected to the voltage input and to the voltage output. The control unit also has an output side connected to the switching element for controlling the switching times of the switching element as a function of the input voltage and the output voltage, to set the voltage ratio and to prevent an excessive rise in the coil current.

With the objects of the invention in view, there is also provided a method for operating the voltage transformer, which comprises measuring the input voltage and the output voltage and calculating the switching times of the switching element as a function of the input voltage and the output voltage. The switching element is driven alternately into conductive and non-conductive states in accordance with the calculated switching times, for achieving a desired voltage ratio of the voltage transformer and to prevent an excessive rise in the coil current.

The invention includes the general technical teaching of using a software-controlled digital control unit, instead of the analog regulator employed with the conventional voltage regulators and implemented relatively expensively in hardware. The digital control unit drives the transistor, preferably as a function of the current measured values of the input voltage and the output voltage.

On one hand, the measurement of the input voltage and the output voltage permits calculation of the switching times of the transistor which are required for the desired voltage transformation. Thus, the transistor is switched on and off for prescribed time intervals, with a change in the switching times by pulse-width modulation and/or pulse-frequency modulation permitting the voltage ratio to be set.

On the other hand, the measurement of the output voltage and the input voltage serves the purpose of avoiding an excessive rise in the coil current beyond the maximum permissible value as the transistor is being switched through. The control unit therefore calculates, from the measured values of the input voltage and the output voltage as well as from various parameters of the voltage transformer circuit, the time interval for which the transistor may be switched through to its greatest extent until the maximum permissible value of the coil current is reached. It is particularly advantageous in this case that an excessive rise in the coil current is prevented in the case of the voltage transformer according to the invention without the need to measure the coil current itself, as is the case with the known voltage transformers described at the outset.

The operating method according to the invention for such a voltage transformer includes a plurality of steps which are carried out periodically.

In a first step, the input voltage and the output voltage are measured—as already described above. Subsequently, this is used to calculate the switching times of the transistor which on one hand deliver the desired voltage ratio, and on the other hand prevent the coil current from exceeding the maximum permissible value. Finally, the transistor is then alternately switched on and off in accordance with the previously calculated switching times.

In this case, the transistor is preferably switched on and off with a prescribed switching period. The duration of the switching period is preferably calculated as a function of the maximum permissible coil current, the inductance of the coil and the input voltage of the voltage transformer, and is able, for example, to have an order of magnitude of 30 to 50 microseconds.

The measurement of the output voltage and the input voltage of the voltage transformer is preferably likewise performed periodically in accordance with a prescribed measuring period. The duration of the measuring period is preferably substantially longer than the duration of the switching period. Thus, the duration of the measuring period can, for example, have an order of magnitude of one millisecond, which still permits the measurement to be implemented in a relatively simple way in terms of circuitry.

The invention is not limited to the above-described transistor with regard to the switching element to be used. Further, the invention can also be implemented with other controllable switching elements. Moreover, the control unit can optionally operate in a digital or analog manner and be constructed as software or hardware. It is also to be mentioned that the switching times of the controllable switching element can be varied in manifold ways in order to achieve the desired voltage ratio. Thus, for example, the switching element can be pulse-width modulated and/or pulse-frequency modulated, although other types of drives are also possible.

Other features which are considered as characteristic for the invention are set forth in the appended claims.

Although the invention is illustrated and described herein as embodied in a voltage transformer and an associated operating method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
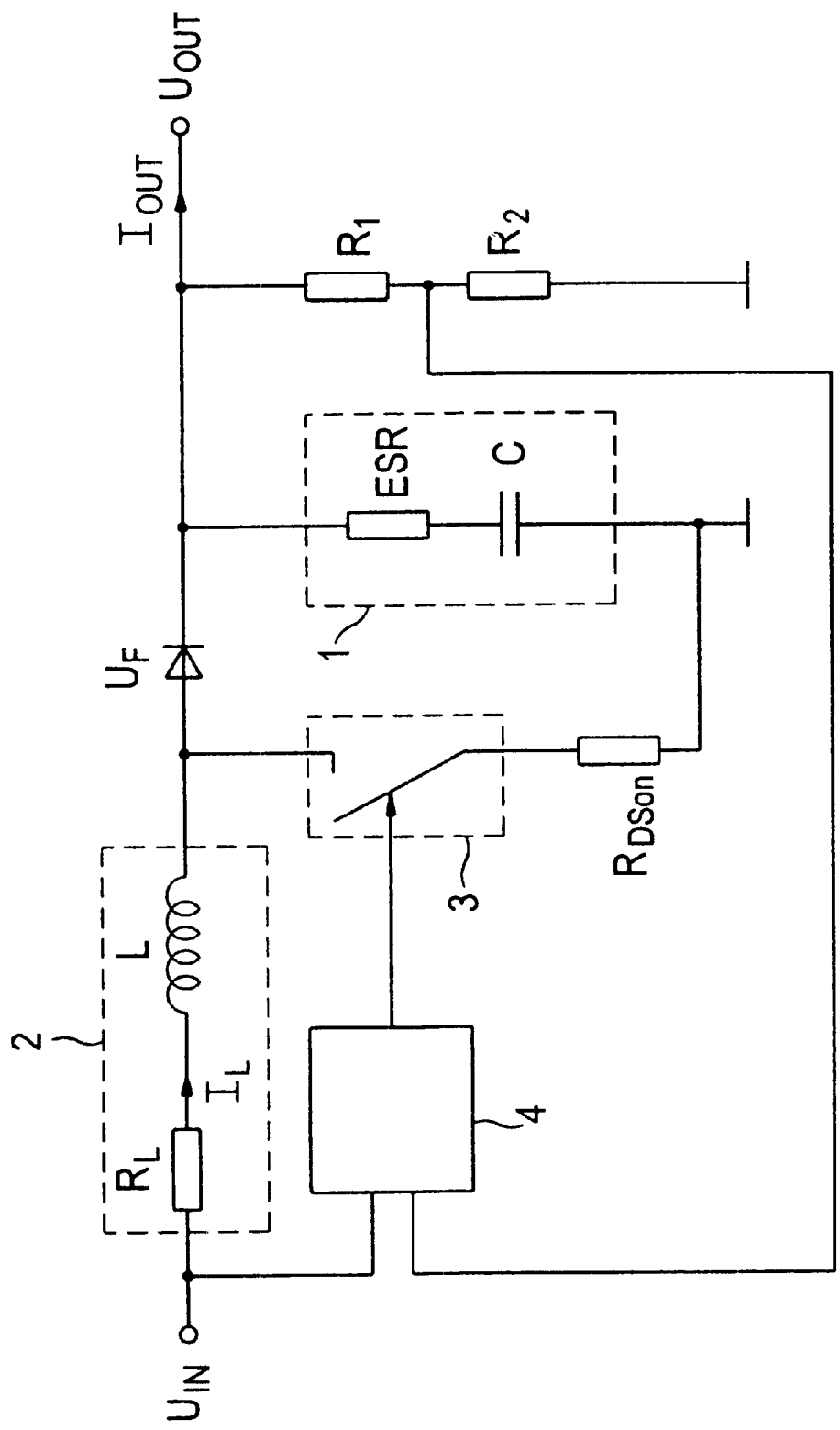
FIG. 1 is a schematic and block circuit diagram of a voltage transformer according to the invention.
Figure 2:
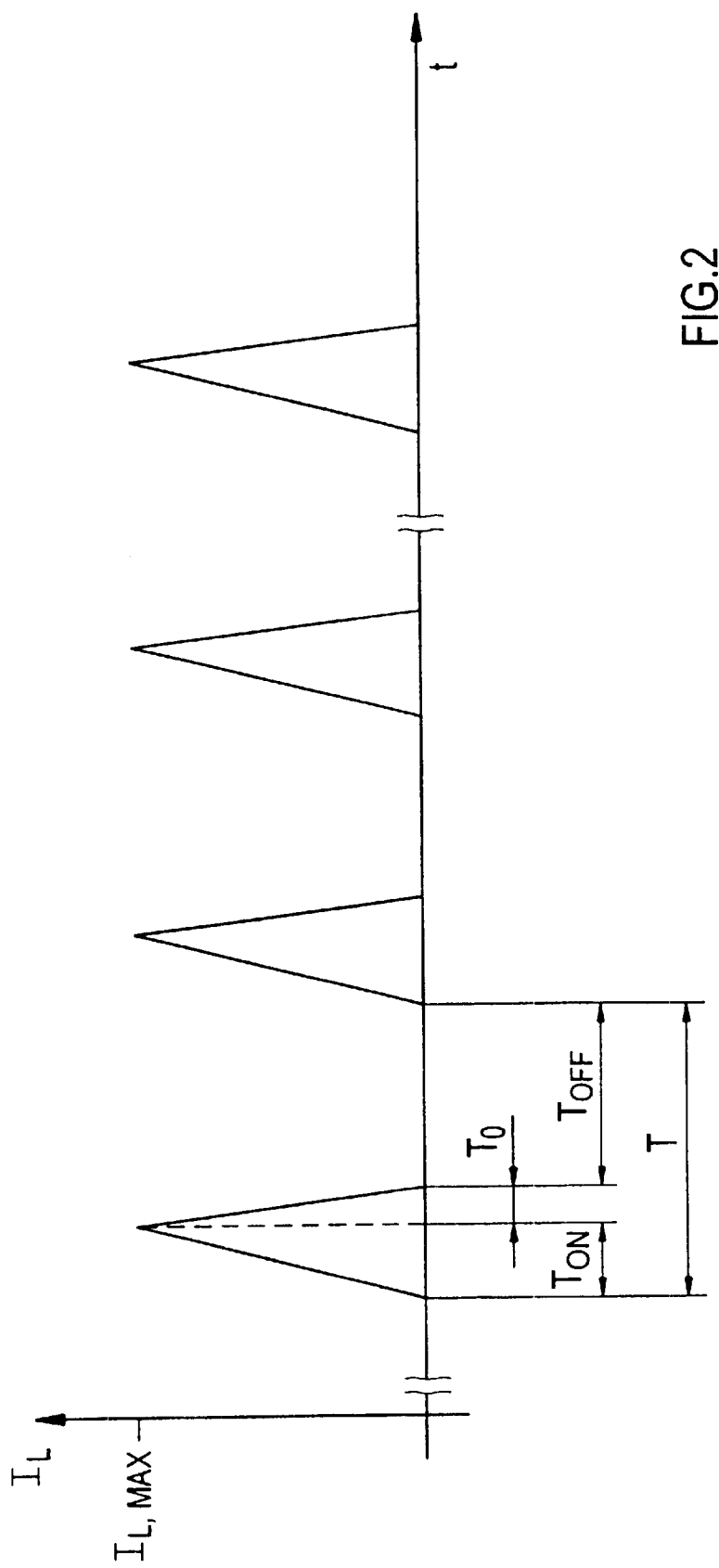
FIG. 2 is a graph showing a time profile of a coil current.
Figure 3:
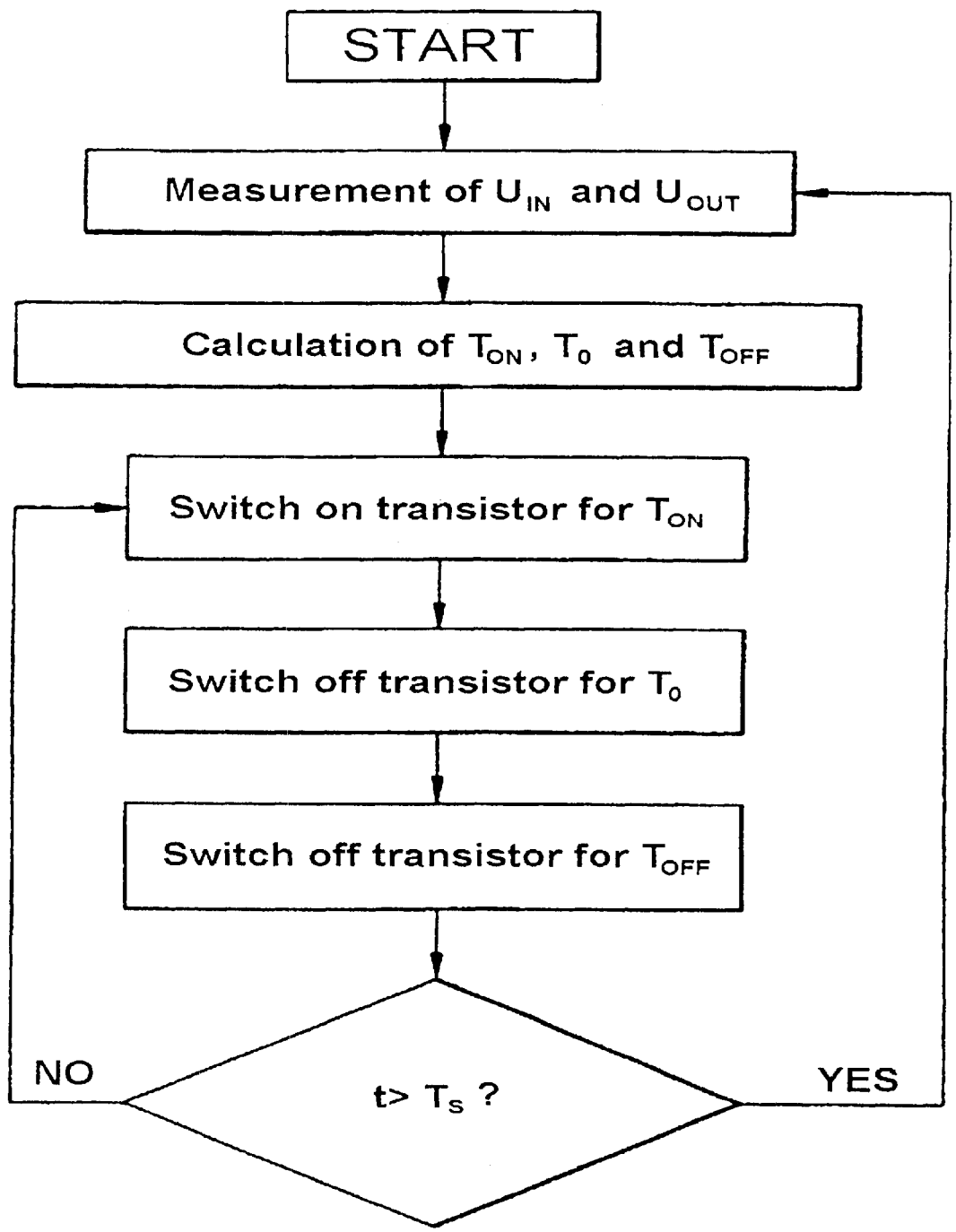
FIG. 3 is a flowchart showing an operating method according to the invention for the voltage transformer according to the invention.

Referring now to the figures of the drawings in detail and first, particularly, to FIG. 1 thereof, there is seen a voltage transformer which is largely of conventional construction and has a capacitor 1 on the output side that is illustrated as an equivalent circuit diagram composed of an ideal capacitance C and an ideal resistance ESR (equivalent serial resistance). The capacitor 1 is connected on the input side, through a series circuit composed of a diode (indicated by a voltage drop $U_F$) and a coil 2, to an input voltage $U_{IN}$. The coil 2 is illustrated as an equivalent circuit diagram composed of an ideal inductance L and an ideal ohmic resistance $R_L$. A transistor 3 which branches off between the diode $U_F$ and the coil 2 is illustrated schematically and is connected to ground through a further ohmic resistor $R_{DSon}$, in such a way that the transistor 3 can bridge the capacitor 1. The transistor 3 is driven by a control unit 4 which is constructed as a microcontroller. The control unit 4 is connected on the input side, on one hand, to the voltage input and, on the other hand, through a voltage divider to a voltage output. The voltage divider includes two resistors R1 and R2. The mode of operation of the voltage transformer described above will now be explained below, with reference being made to an illustration of a time profile of a coil current in FIG. 2 and to a flowchart in FIG. 3. At a start, the control unit switches on the transistor 3, initially for a prescribed time interval $T_{on}$, and therefore the coil 2 forms an RL element with the resistor $R_{DSon}$. This leads to an exponential rise in a coil current $I_L$. The time interval $T_{ON}$ is calculated in this case as a function of a maximum permissible coil current $I_{Lmax}$, an inductance L of the coil and the input voltage $U_{IN}$, using the following formula:

$$T_{on} = \frac{I_{Lmax} \cdot L}{U_{IN}}.$$

After the maximum permissible coil current $I_{Lmax}$ is reached, the control unit then switches off the transistor 3, at least for a prescribed time interval $T_0$, in order to prevent a further rise in the coil current $I_L$ beyond the maximum permissible value. The time interval $T_0$ is calculated as a function of the maximum permissible coil current $I_{Lmax}$, the inductance L of the coil, the input voltage $U_{IN}$, a voltage drop $U_F$ across the diode and a capacitor voltage $U_C$ measured across the voltage divider R1, R2, by using the following formula:

$$T_0 = \frac{I_{Lmax} \cdot L}{U_C + U_F - U_{IN}}.$$

During the time interval $T_0$, the coil 2 forms a series circuit with the diode $U_F$ and the capacitor 1, in such a way that the coil current $I_L$ flows through the capacitor 1 and recharges the latter. The coil current $I_L$ thereby decreases down to zero by the end of the time interval $T_0$.

The transistor 3 subsequently then remains switched off for a prescribed third time interval $T_{off}$, and this leads to a slow discharge of the capacitor as a function of the load on the output side. The output voltage of the voltage transformer is set in this case by varying the time interval $T_{off}$ through driving the transistor 3 appropriately. The time interval $T_{off}$ is calculated in this case as a function of a desired/actual deviation $U\Delta$ of the output voltage, an output current $I_{OUT}$, a regulator period $T_S$ and the above-mentioned variables, by using the following formula:

$$T_{off} = L \cdot I_{Lmax} \cdot \frac{T_S \cdot I_{Lmax} \cdot U_{IN} - (U_C + U_F) \cdot (2 \cdot C \cdot U\Delta + 2 \cdot T_S \cdot I_{OUT})}{U_{IN} \cdot (U_C + U_F - U_{IN}) \cdot (2 \cdot C \cdot U\Delta + 2 \cdot T_S \cdot I_{OUT})}.$$

After a plurality of such switching periods with a length of $T=T_{on}+T_0+T_{off}=30 \ldots 50$ μs the capacitor 1 is then recharged to the extent that the desired output voltage $U_{OUT}$ is reached. The current values of the output voltage $U_{OUT}$ and the input voltage $U_{IN}$ are measured in prescribed regulating periods $T_S$ of approximately one millisecond so that the control unit 4 can recalculate the switching times for the transistor 3. The input voltage and the output voltage are therefore not calculated after each switching period T, since such a rapid sampling would be associated with an unjustifiable outlay for circuitry.

Instead of the complicated calculation of the time $T_{off}$ in accordance with the above formula, the duration T of the switching period can also be calculated in accordance with the following formula:

$$T = \frac{T_0 \cdot T_S \cdot I_{L\max}}{2 \cdot C \cdot U\Delta + 2 \cdot T_S \cdot I_{OUT}}.$$

The time interval $T_{off}$ is then yielded in a simple way in accordance with the following formula:

$$T_{off} = T - T_0 - T_{on}.$$

An advantage of the voltage transformer described above and of the associated operating method is the fact that an excessive rise in the coil current $I_L$ beyond the maximum permissible value is avoided without the need for continuous measurement of the coil current. Moreover, the control unit 4 can be implemented in a simple way as a software-controlled microcontroller.

Figure 4:
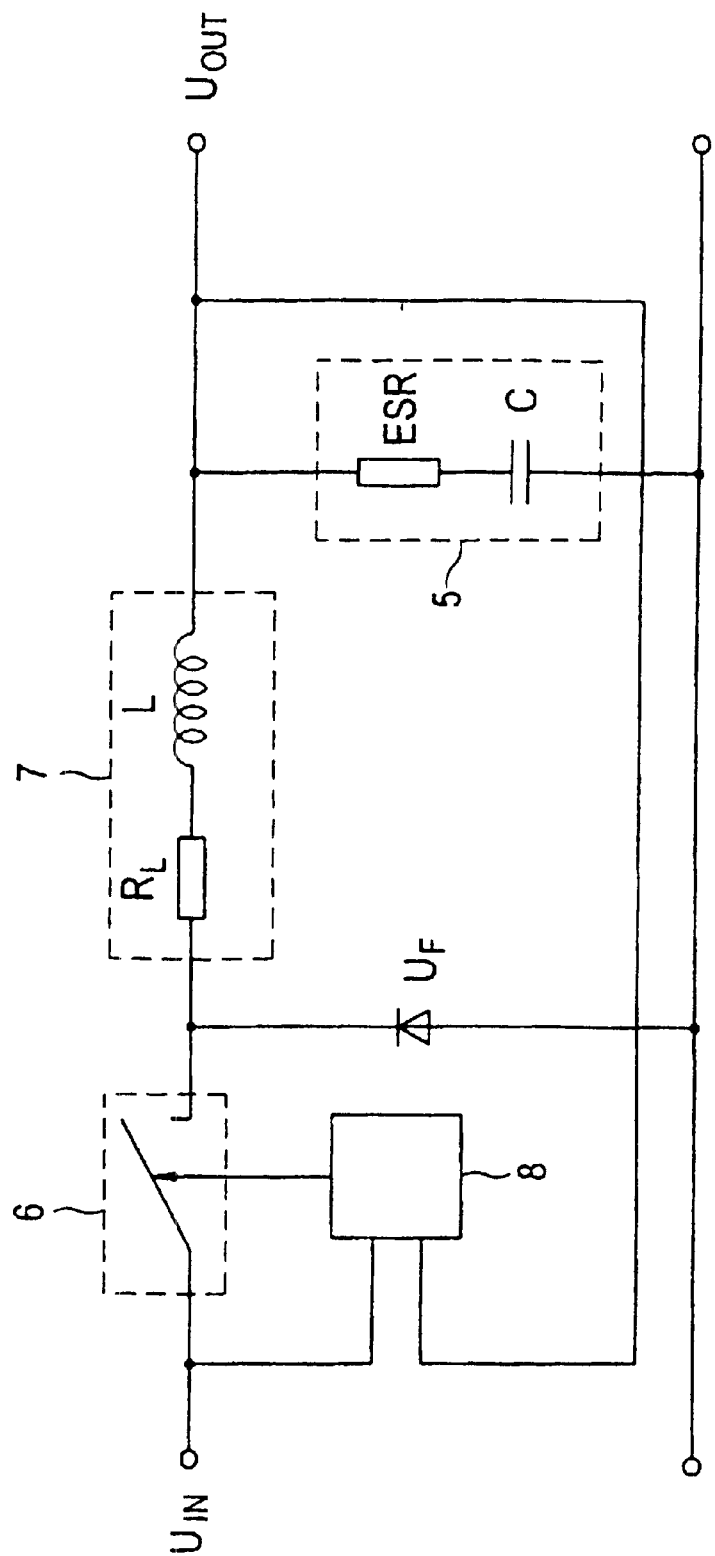
FIG. 4 is a schematic and block circuit diagram of an alternative exemplary embodiment of the invention in the form of a step-down regulator for reducing a voltage level.

In contrast with the exemplary embodiment described above, an exemplary embodiment of a voltage transformer according to the invention which is illustrated in FIG. 4 serves to reduce the voltage level, and is designated as a step-down regulator. The step-down regulator likewise has a capacitor 5 on the output side, which is illustrated as an equivalent circuit diagram composed of an ideal ohmic resistance ESR and an ideal capacitance C. The capacitor 5 is connected on the input side through a series circuit, composed of a controllable switching element 6 and a coil 7, to the input voltage $U_{IN}$. The coil 7 is illustrated as an equivalent circuit diagram composed of an ideal ohmic resistance $R_L$ and an ideal inductance L. The switching element 6 is driven in this case by an electronic control unit 8 which is connected on the input side to the voltage input and the voltage output. A diode (indicated by a voltage drop $U_F$) which branches off between the coil 7 and the switching element 6 is connected to ground and is reverse-biased.

The mode of operation of the step-down regulator will now be described below, with reference being made to the above description of the structure of the step-down regulator.

At the start, the switching element 6 is switched on by the control unit 8 for a predetermined time interval $T_{ON}$. The control unit 6 calculates the time interval $T_{ON}$ as a function of the maximum permissible coil current $I_{L\max}$, the inductance L, the input voltage $U_{IN}$ and the output voltage $U_{OUT}$ according to the following formula:

$$T_{ON} = \frac{I_{L\max} \cdot L}{U_{IN} - U_{OUT}}.$$

The switching element 6 is then subsequently switched off by the control unit 8 for a prescribed time interval $T_0$, in order to return the coil current. The control unit 8 calculates the time interval $T_0$ according to the following formula:

$$T_0 = \frac{I_{L\max} \cdot L}{U_{OUT} + U_F}.$$

The switching element 6 then remains switched off for a further time interval $T_{off}$ after expiration of the time interval $T_0$. It is possible for the transformation ratio of the step-down regulator to be set by varying the time interval $T_{off}$. The time interval $T_{off}$ is calculated by the control unit 8 as a function of the regulating period $T_S$, the desired/actual deviation $U\Delta$ of the output voltage and the already previously mentioned variables, by using the following formula:

$$T_{off} = \frac{L \cdot I_{L\max} \cdot (U_{IN} + U_F) \cdot \left(\frac{I_{L\max}}{2} - I_{OUT} - U\Delta \cdot \frac{C}{T_S}\right)}{(U_{IN} - U_{OUT})(U_{OUT} + U_F) \cdot \left(U\Delta \cdot \frac{C}{T_S} + I_{OUT}\right)}.$$

Instead of the complicated calculation of the time $T_{off}$ in accordance with the above formula, it is also possible to calculate the duration T of the switching period in accordance with the following formula:

$$T = \frac{T_0 \cdot T_S \cdot I_{L\max}}{2 \cdot C \cdot U\Delta + 2 \cdot T_S \cdot I_{OUT}}.$$

The time interval $T_{off}$ is then yielded in a simple way in accordance with the following formula:

$$T_{off} = T - T_0 - T_{on}.$$

The structure of the invention is not limited to the previously specified preferred exemplary embodiments. Rather, it is possible to conceive of a number of variants employing the solution represented herein, even with structures of a fundamentally different nature.

I claim:

1. A method for operating the voltage transformer, which comprises:
    measuring an input voltage and an output voltage of a transformer having:
      an input side having a voltage input carrying the input voltage;
      an output side having a voltage output carrying the output voltage;
      a capacitor disposed on the output side and providing the output voltage;
      a coil having a coil current;
      a controllable switching element connected to the coil for controlling current flowing through the coil, the switching element having switching times for setting a voltage ratio; and
      a control unit having:
        an input side connected to the voltage input and to the voltage output; and
        an output side connected to the switching element for controlling the switching times of the switching element as a function of the input voltage and the output voltage, for setting the voltage ratio, and for preventing an excessive rise in the coil current;
    calculating the switching times of the switching element as a function of the input voltage and the output voltage;
    driving the switching element alternately into conductive and non-conductive states in accordance with the calculated switching times for achieving a desired voltage ratio of the voltage transformer and to prevent an excessive rise in the coil current;

periodically switching the switching element into the conductive and non-conductive states with a prescribed switching period;

switching the switching element into the conductive state at a start of each switching period for a prescribed initial time interval to bridge the capacitor;

calculating the initial time interval as a function of a maximum permissible coil current, an inductance of the coil, and the input voltage of the voltage transformer;

switching the switching element into the non-conductive state in each switching period after expiration of the initial time interval, at least for a prescribed subsequent time interval, to extinguish the coil current;

calculating the subsequent time interval as a function of the maximum permissible coil current, the inductance of the coil, the input voltage, and the output voltage;

additionally switching the switching element into the non-conductive state in each switching period after expiration of the subsequent time interval, until the end of the switching period, for an additional time interval, to set the desired voltage ratio; and calculating the additional time interval as a function of a capacitance of the capacitor, the maximum permissible coil current, the initial time interval, and the subsequent time interval.

2. The method according to claim 1, which further comprises periodically measuring the input voltage and the output voltage with a prescribed measuring period having a duration substantially greater than a duration of the switching period.

* * * * *

UNITED STATES PATENT AND TRADEMARK OFFICE
CERTIFICATE OF CORRECTION

PATENT NO.    : 6,476,588 B2
DATED         : November 5, 2002
INVENTOR(S)   : Manfred Fröhler It is certified that error appears in the above-identified patent and that said Letters Patent is hereby corrected as shown below:

<u>Title page,</u>
Item [75], should read as follows:

-- Manfred Fröhler, Mühlhausen (DE) --

Signed and Sealed this

Eighteenth Day of February, 2003

JAMES E. ROGAN
*Director of the United States Patent and Trademark Office*